S. I. FEKETE AND S. G. BAITS.
GEAR ENGAGING MECHANISM FOR SELF STARTERS.
APPLICATION FILED JAN. 22, 1919.

1,347,265.

Patented July 20, 1920.

INVENTORS:
Stephen I. Fekete
Stuart G. Baits.
by Macleod, Calver, Copeland & Dike.
Attys.

UNITED STATES PATENT OFFICE.

STEPHEN I. FEKETE AND STUART G. BAITS, OF DETROIT, MICHIGAN, ASSIGNORS TO ESSEX MOTORS, OF DETROIT, MICHIGAN, A CORPORATION OF MICHIGAN.

GEAR-ENGAGING MECHANISM FOR SELF-STARTERS.

1,347,265.   Specification of Letters Patent.   Patented July 20, 1920.

Application filed January 22, 1919. Serial No. 272,409.

*To all whom it may concern:*

Be it known that we, STEPHEN I. FEKETE, a subject of the King of Hungary, and STUART G. BAITS, a citizen of the United States, both residing at Detroit, in the county of Wayne, State of Michigan, have invented a certain new and useful Improvement in Gear-Engaging Mechanism for Self-Starters, of which the following is a specification, reference being had therein to the accompanying drawings.

The present invention relates to mechanism for automatically engaging and disengaging the pinion with the gear of a self-starter for an internal combustion engine. The invention is intended particularly for use in connection with electrically driven self starters.

Heretofore two types of mechanisms have been employed for this purpose. The first type which may be referred to as a manual control is positive in its action and is satisfactory in use but is comprised of many parts and therefore is expensive. Furthermore it can conveniently be located only in certain positions on the vehicle.

The second type may be referred to as the Bendix drive and depends for its operation on a screw and a nut formed inside a pinion, the nut being caused to travel lengthwise of the screw and engage the pinion teeth with the teeth of the fly wheel. The only control mechanism required for the Bendix drive is an electric switch and this may be placed anywhere about the vehicle. The Bendix drive as constructed commercially is subject to the great objection that it tends to destroy the teeth on the fly wheel. This is the result of the following action. When the pinion teeth on the nut move up to the fly wheel, they are likely to collide with its teeth instead of entering the spaces between them. If this occurs, it stops both the longitudinal and angular movement of the pinion, but the screw shaft on which the pinion is mounted, screws itself out of the pinion and moves lengthwise compressing the driving spring and pushing the pinion harder and harder into the fly wheel. Finally the coils of the spring close and the whole torque of the starting motor jams the pinion into the fly wheel shearing off a portion of the teeth of the fly wheel. In time the pinion nut and fly wheel gear become locked together and can be dislodged only with great difficulty and the car cannot be started even by hand cranking until the parts have been separated. After this has occurred once, it recurs with increasing frequency as the fly wheel or large gear becomes more worn. Eventually it is necessary to provide a new fly wheel.

These difficulties minimize the value of the Bendix drive and are the source of great trouble to users of vehicles equipped with this drive.

The present invention has for its object to overcome altogether the difficulties hereinbefore mentioned and to provide mechanism which renders the Bendix drive free from the objections hereinbefore stated as well as affording certain other important advantages.

The invention consists broadly in providing a resilient connection between the nut and pinion by the action of which a certain play or lost motion between the two parts is permitted which enables the tooth of the pinion to find the space in the fly wheel and in providing also a positive driving connection between the armature shaft and the pinion which shall take the driving load after the pinion and fly wheel gear are engaged. In the preferred form of my device this positive connection is through a dog clutch connecting the nut and pinion, while in a modification of our device the positive connection is afforded by a second set of screw threads on the armature shaft which engage screw threads on the nut after the teeth of the pinion and gear have engaged each other.

The invention will be fully understood from the following description when taken in connection with the accompanying drawings and the novel features thereof will be pointed out and clearly defined in the claims at the close of this specification.

In the drawings, Figure 1 is a side elevation partly in section of mechanism embodying our invention.

Figure 1:
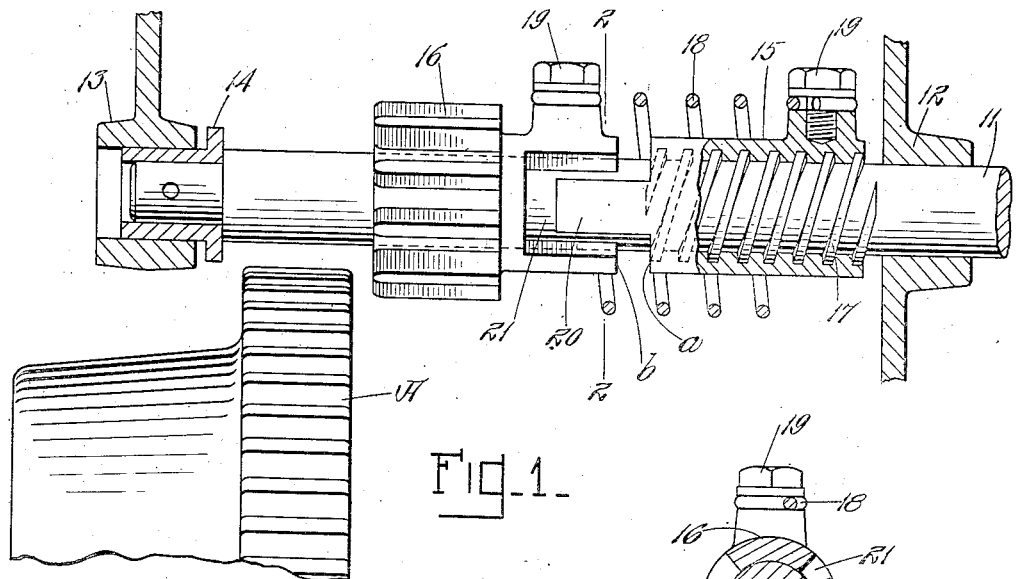
Figure 2:
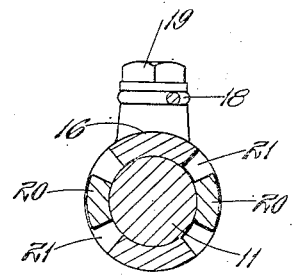
Fig. 2 is a section on line 2—2 showing the construction of the dog clutch.

Referring now to the drawings, at A is shown the gear which on an automobile is ordinarily formed on the rim of the fly wheel and upon which the self starter pinion acts. At 11 is shown the armature shaft of an electric self starter. It is screw threaded at 17. This shaft is mounted in bearings 12 and 13 and is provided at the left hand end with a sleeve 14 which acts as a stop as will be hereinafter more fully described. At 15 is shown a nut and at 16 a pinion. The nut is screw threaded but the screw threads therein fit the screw threads on the armature shaft very loosely so that the inertia or lag of the nut 15 when the armature shaft 11 is caused to revolve suddenly will make the nut 15 travel lengthwise of the armature shaft in the manner well understood by persons familiar with the construction and operation of Bendix drives. The nut 15 and pinion 16 are yieldingly connected by a spring 18 secured to the said parts by the cap screws 19. When in driving position, the nut 15 and pinion 16 are also connected by means of some form of clutch which is preferably positive in its action so that none of the driving load is taken by the spring 18. In the form shown in the drawings, the nut 15 is provided with a male member 20 of a dog clutch while the pinion 16 is provided with a female member 21. It will be seen by reference to Fig. 2 that there is considerable space between the teeth of the clutch members so that there is a lost motion between the two members. The spring 18 is designed to hold the teeth 20 of the male member about mid-way of the spaces 21 in the female member. The spring also holds the members of the clutch partly separated longitudinally, and therefore the nut and pinion are capable of movement relatively to each other both circumferentially and longitudinally. The sleeve 14 affords a stop to prevent the pinion traveling too far to the left as indicated in Fig. 1.

Figure 3:
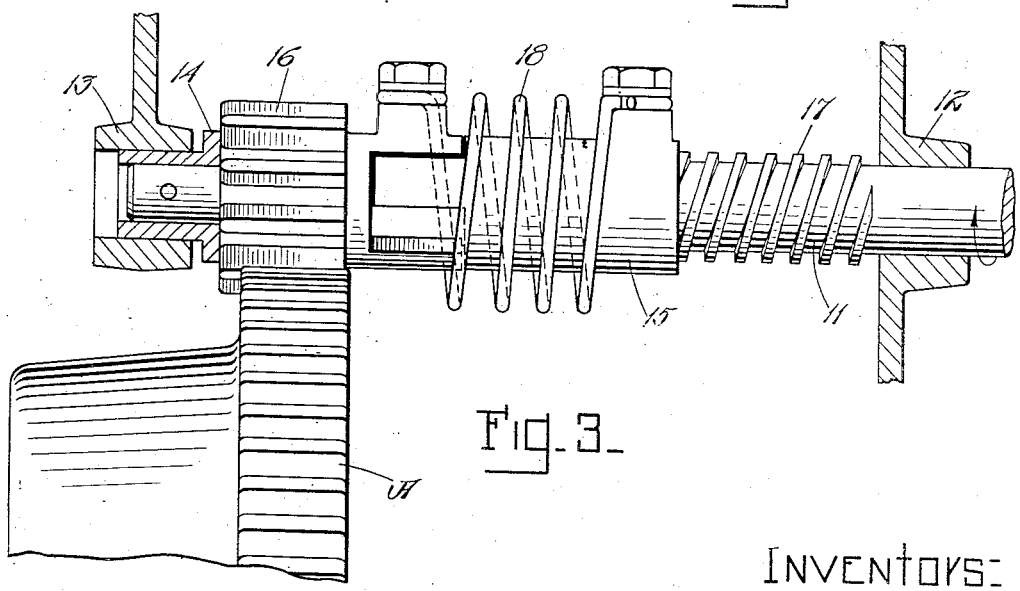
Fig. 3 shows the position of the parts when the pinion has been shifted to engage the gear.

The operation of this device is as follows: When current is turned on to the motor of the self-starter, the armature shaft 11 is caused to revolve clockwise as shown by the arrow in Fig. 3. The sudden movement of the shaft while the nut 15 and pinion 16 tend to remain stationary, owing to their weight and the eccentricity of certain parts, causes the nut 15 and pinion 16 to travel quickly toward the left. During this time, the male members 20 of the dog clutch remain substantially mid-way of the spaces in the female member. If the ends of the teeth on the pinion 16 do not happen to enter the spaces between the teeth of the gear A but strike the ends of the teeth, the friction between them retards the rotary movement of the pinion relatively to that of the nut 15, this being permitted by the spring 18. At the same time the nut continues to advance along the shaft and to rotate compressing the spring 18 somewhat and tending to lessen the distance between the shoulder $a$ on the nut and the shoulder $b$ on the pinion. When the spring 18 is wound up enough to overcome the friction between the ends of the gear teeth and the teeth of the pinion 16, it rotates the pinion and thereby brings the teeth of the pinion opposite to spaces in the gear A. The pressure of the spring 18 which is all the time being urged forward by the nut 15 then pushes the pinion into engagement with the gear until the face of the pinion brings up against the face of the sleeve 14. The further rotation of the armature shaft turns the nut relatively to the pinion and the faces of the dog clutch come into contact and afford a positive drive.

When the engine has started and begins to drive the pinion faster than the armature shaft 11, the screw 17 on the armature shaft pulls the pinion out of engagement with the gear A.

From the foregoing it will be seen that the mechanism embodying the invention in its preferred form is such that in case the ends of the teeth of the pinion collide with the ends of the teeth on the fly wheel gear, the spring being acted upon by the nut 15 will tend to rotate the pinion slightly so that its teeth will then enter the space between the teeth of the fly wheel gear and furthermore under these conditions the screw cannot exert injurious pressure on the fly wheel teeth since the spring is interposed between the nut and the pinion. It will also be seen that, as soon as the gear and pinion are fully engaged, the drive is positive because the shoulder on the nut strikes the end face of the pinion and thereafter both the nut and the pinion are immovable lengthwise of the shaft and are driven by the engagement of the threads 17 with the nut. By this construction the difficulties which have been experienced in the past as a result of the drive through the spring are entirely obviated. It will be seen that the dog clutch constitutes a positive driving connection between the armature shaft and the fly wheel gear, and that positive connections of other forms may be employed.

Figure 4:
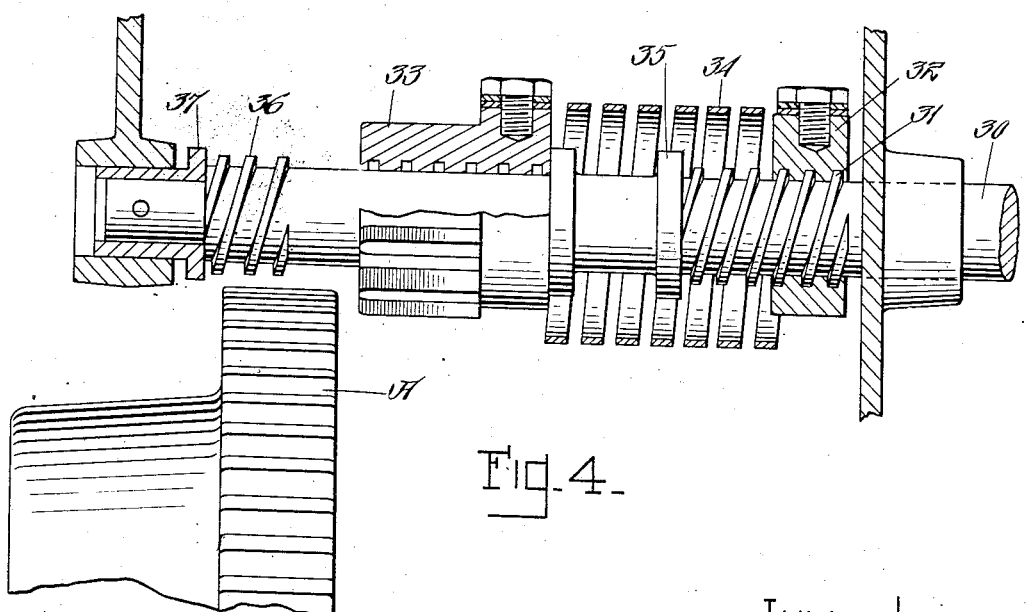

In Fig. 4 a different form of positive driving connection between the pinion and the armature shaft is shown. In this embodiment of the invention, the armature shaft 30 is screw threaded as shown at 31 and carries a nut 32. The pinion 33 is screw threaded on the interior and is connected to the nut by a spiral spring 34. The armature shaft 30 is also provided with a fixed collar 35 to limit the travel of the nut 32. In addition to the screw threads 31 the armature shaft is provided with screw threads 36 located at the left hand end of the shaft and said threads are of a pitch and size to coöperate with the threads on the interior of the pinion 33. A sleeve 37 is also provided to limit the movement of the pinion 33 toward the left. This embodiment of the invention operates in substantially the same way as that previously described. When the armature shaft begins to rotate, the nut 32 and pinion 33 are caused to travel toward the fly wheel. If the pinion 33 strikes the ends of the teeth of the fly wheel and does not mesh, the pinion will lag behind the nut until the spring 34 stores sufficient force to overcome the friction between the ends of the teeth. The spring then rotates the pinion enough to permit the teeth to engage. The pressure which the pinion teeth can exert upon the ends of the fly wheel teeth is limited by the strength of the spring 34. After the pinion 33 has engaged the teeth of the fly wheel gear, its further travel to the left causes the threads 36 on the armature shaft to engage with the female threads on the inside of the pinion 33 so that when the pinion 33 comes up against the sleeve 37 the armature shaft and pinion are locked together and there is a positive drive of the fly wheel. The parts are maintained in this position as long as the armature shaft is the driving shaft since the screw 36 tends to hold the pinion against the shoulder 37. As soon as the speed of the engine increases so that the fly wheel becomes the driving member the pinion 33 unscrews from the threads and moves over to the position shown in Fig. 4.

Figure 5:
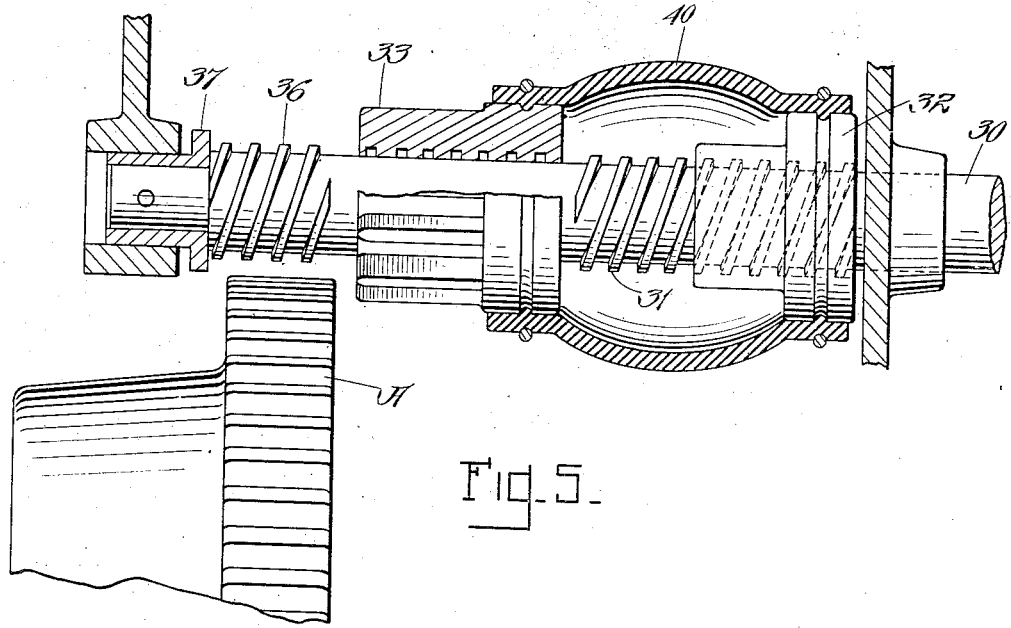
Figs. 4 and 5 illustrate modified forms of our invention.

The device shown in the form in Fig. 5 is identical with the embodiment shown in Fig. 4 except that a flexible tube 40 is substituted for the spring 34. This tube may be made of rubber and fabric or a combination of the two and has sufficient elasticity both radially and longitudinally to perform all the functions of the spring 34.

What we claim is:

1. In combination with a gear, a driving shaft having a screw threaded portion, a nut mounted on said shaft and bearing one member of a clutch, a pinion mounted on the said shaft movable thereon and having the other member of said clutch, and a yielding connection between said nut and said pinion.

2. In combination with a gear, a driving shaft having a screw threaded portion, a nut mounted on said shaft and having formed thereon one member of a positive clutch, a pinion having the other member of said positive clutch, said clutch members being constructed to permit a lost motion between the members and when the limit of said lost motion is reached producing a positive interlock between the members, and a yielding member connecting the said nut and said pinion and tending to hold said clutch members out of engagement with each other.

3. In combination with a gear of an engine to be started, an armature shaft having a screw threaded portion, a nut mounted on said shaft and having formed therein one member of a dog clutch, a pinion slidable lengthwise of the shaft and having the other member of the dog clutch formed in it, the members of said clutch being constructed to permit lost motion, and a spring connecting said nut and said pinion and holding the clutch members normally out of engagement with each other.

4. In combination with a gear of an engine to be started, an armature shaft having a screw threaded portion, a nut thereon, a pinion mounted on said shaft, a yielding connection between said members permitting movement of one member relatively to the other both circumferentially and longitudinally of the shaft, said nut and pinion being provided with clutch members which furnish a positive connection between the two after a predetermined amount of lost motion has been absorbed.

5. In combination with a gear of an engine to be started, an armature shaft having a screw threaded portion, a nut thereon, a pinion mounted on said shaft, a yielding connection between said members permitting movement of one member relatively to the other both circumferentially and longitudinally of the shaft, the proximate faces of said members being shaped to form the interlocking members of a dog clutch.

In testimony whereof we affix our signatures.

STEPHEN I. FEKETE.
STUART G. BAITS.